United States Patent [19]

Jürgens et al.

[11] Patent Number: 4,553,614
[45] Date of Patent: Nov. 19, 1985

[54] COMPENSATION DEVICE FOR INSERTION IN A DRILL STRING FOR DEEP-WELL DRILLING TOOLS

[75] Inventors: Rainer Jürgens, Celle-Osterloh; Thomas Jüng, Isernhagen, both of Fed. Rep. of Germany

[73] Assignee: Norton Christensen, Inc., Salt Lake City, Utah

[21] Appl. No.: 585,812

[22] Filed: Mar. 2, 1984

[30] Foreign Application Priority Data

Mar. 10, 1983 [DE] Fed. Rep. of Germany ....... 3308441

[51] Int. Cl.$^4$ .................. E21B 4/06; E21B 17/043
[52] U.S. Cl. .................. 175/302; 403/343; 285/355
[58] Field of Search ........... 175/299, 305, 302, 306, 175/297, 257, 296, 300, 301; 285/31, 32, 36, 298, 302, 333, 355, 12, 347, 350; 403/343, 3; 267/177, 125

[56] References Cited

U.S. PATENT DOCUMENTS

| | | | |
|---|---|---|---|
| 2,179,202 | 11/1939 | Simpson | 285/355 |
| 2,535,320 | 12/1950 | Richardson | 285/353 |
| 2,539,057 | 1/1951 | Brown | 285/333 |
| 4,118,135 | 10/1978 | Cooper | 403/343 |
| 4,511,007 | 4/1985 | Jung et al. | 175/297 |

*Primary Examiner*—James A. Leppink
*Assistant Examiner*—David J. Bagnell
*Attorney, Agent, or Firm*—Walter Fred

[57] ABSTRACT

A compensation device for deep-well drilling tools with a transversely divided outer pipe, the pipe members (1 and 2) of which can be rigidly connected to one another by a screw thread (8) and comprise adjacent end faces (5 and 6) as stop faces which approach one another when the pipe members are screwed together and move apart from one another during the unscrewing, comprises a spacing member (3) which can be inserted radially, from the outside, between the end faces. The screw thread (8) has a length of engagement which secures the firm connection between the pipe members within the whole preset compensating range.

5 Claims, 2 Drawing Figures

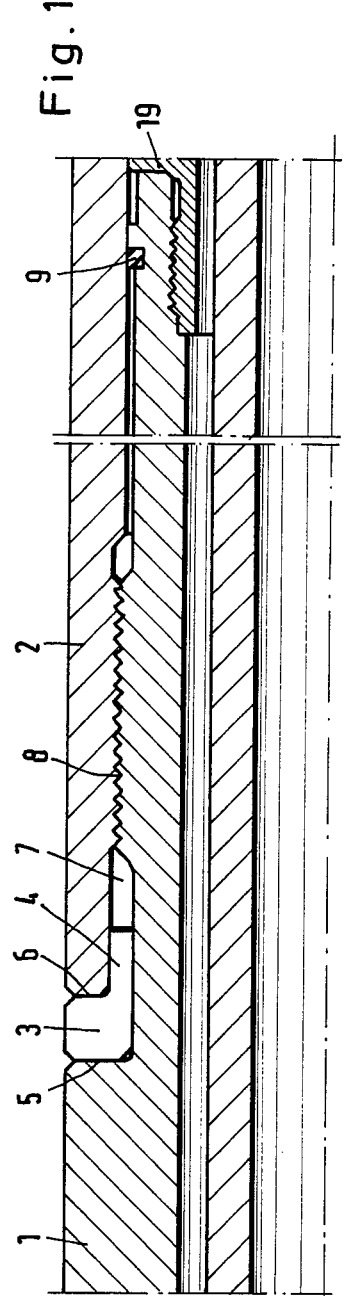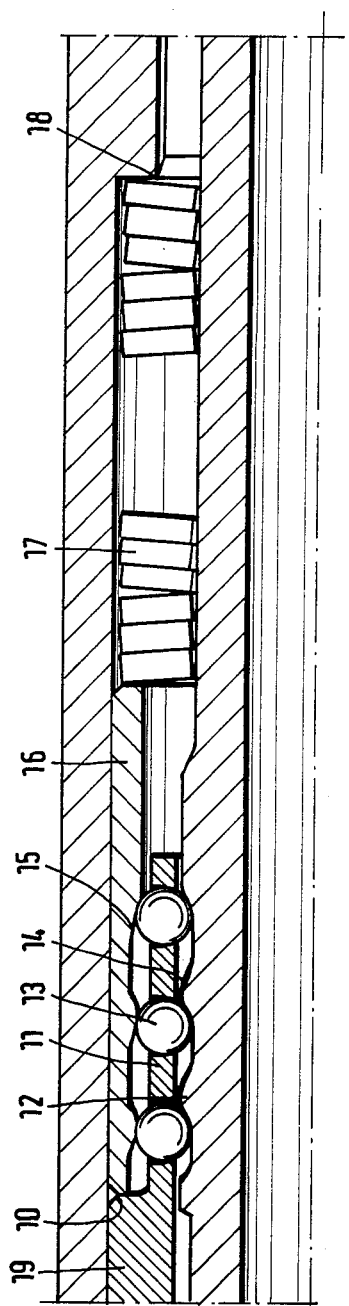

COMPENSATION DEVICE FOR INSERTION IN A DRILL STRING FOR DEEP-WELL DRILLING TOOLS

This invention relates to a compensation device for insertion in a drill string for deep-well drilling tools.

Deep-well drilling tools may have components which are disposed within the outer pipe or drill string and are not rigidly connected to the outer pipe. Such components may be located between internal shoulders on the outer pipe, thus ensuring correct axial positioning. The compensation for manufacturing tolerances, operational wear or the presetting of specific initial spring tensions can be brought about by varying the spacing of these inner shoulders.

In a known compensating device for this purpose, one shoulder of the outer pipe is made rigid while the other inner shoulder is formed by a sleeve which is axially displaceable but held against rotation and which is screw coupled with a sleeve which is axially located but rotatable. Rotation of the rotatable sleeve is effected via gearing through an opening in the outer pipe.

In another known compensating device (U.K. Patent Specification No. 794623) for a drill bit mounted at the end of a drilling string, shims, each forming a closed ring, are used to produce its gauge which shims, when the shank of the bit is completely unscrewed from the lower drill pipe, are pushed onto its threaded pin and then, after the fitting and screwing of the shank of the bit to the drill pipe, are braced between their outer end faces. As the production of the gauge declines, the shims are gradually removed, after renewed complete unscrewing of the screw connection each time, in order that the cutting elements may be able to be urged radially outwards by means of a part pushed further by the pin penetrating further into the shank of the bit as a result.

It is the object of the invention to provide a compensation device for deep-well drilling tools which can be inserted in a drilling string, and which is particularly simple in construction, operation and checking.

The present invention is a compensation device for insertion in a drill string for deep-well drilling tools, the drill string having a transversely divided outer pipe, the pipe members of which can be rigidly connected to one another by a cylindrical screw thread and have adjacent end faces as stop faces which approach one another during the screwing together of the pipe members and move apart from one another during the unscrewing, characterised in that the compensation device comprises a spacing member composed of segments which can be inserted radially from the outside and located between the end faces of the pipe members and which can be joined together to form a ring between the end faces and that the screw thread has a length of engagement which is increased by the axial length of the whole predetermined compensating region.

The simplicity of the construction of the compensation device results from the few additional parts and the inclusion of the screw connection necessary for the connection of the pipe members of the outer pipe. The manufacturing tolerances to be adhered to during the production of the compensation device can be left within the range usual in the production of outer pipes and their screw connections so that an economical manufacture is possible. In addition, the compensation device according to the invention proves very robust because the same materials are used as for the outer pipe, an adequate wall thickness can be left in the region of the connection of the pipe members and the high locking moment of the screwed pipe members prevents an automatic displacement of the compensating device.

Adjustment of the compensation device is effected by partial unscrewing of the pipe members, insertion of the appropriate spacing member and subsequent screwing together. The adjusting measures are similar to the usual unscrewing and screwing together of the drill-pipe connections and are carried out with the tools present on the drilling rig. The adjustment can even be carried out if the tool associated with the drilling string is suspended in the derrick.

A well-defined, reproducible adjustment which can be checked is possible as a result of the adjusting measures being carried out only from the outside, because the spacing of the external stop faces of the pipe members forms a direct measure for the spacing of the inner shoulders at the same time. Furthermore, the adjusting measures do not require intervention in the interior of the tool, which is generally filled with oil for the lubrication and pressure compensation and is sealed off from the outside.

An embodiment of the present invention will now be described, by way of example, with reference to the accompanying drawing, in which:

FIG. 1 is a longitudinal half section through an upper portion of a tool having a compensation device according to the invention; and FIG. 2 is a longitudinal half section through a lower portion of the tool following on the upper portion.

The tool portion illustrated in FIGS. 1 and 2 and utilising the compensation device forms a locking system for a hydraulic drilling jar such as may be constructed, for example, in accordance with German Patent Specification No. 2619472. A locking system for such a drilling jar prevents the telescopic axial displacement of a spindle member in a sleeve member in normal drilling operation, but should be able to be unlocked by superimposing an axial overload when the drilling string is jammed, in order to activate the percussion system of the hydraulic drilling jar.

The outer pipe or drill string receiving the locking device consists of a pipe member 1 connected to a pipe member 2 through a screw thread 8. The locking device is located in the interior of the outer pipe between the internal shoulder 10 on an abutment member 19 screwed to the pipe member 1, and an internal shoulder 18 on the pipe member 2.

The locking device comprises a spindle member 12 with thickened portions 14 ending in a taper, and a sleeve 16 which is disposed between the internal shoulders 10, 18 of the outer pipe and which likewise has tapered inner section regions 15. In the annular space formed between the spindle portion 12 and the sleeve 16 is a ball cage 11 which may be connected to the abutment member 19 or, as shown, forms an integral part thereof. The ball cage 11 includes three regions which are occupied by balls 13 and in which the balls 13 are axially located but are displaceable radially.

In the position illustrated in the drawing, the balls 13 lie, on the inside, against the tapered thickened portions 14 of the spindle member 12 and on the outside against the inner section regions 15 of the sleeve 16. As a result of this free longitudinal displacement of the spindle member 12 towards the left in the drawing is prevented. Further disposed between the sleeve 16 and the shoulder 18 is a set of cup springs 17 which exerts an axial force, directed towards the left, on the sleeve 16.

If an axial force directed to the left is exerted on the spindle member 12 in order to bring about an unlocking, the reaction forces are communicated, via the thickened portions 14 ending in a taper, to the balls 13 and thence to the tapered inner section regions 15 of the sleeve 16 to exert a contractile force, directed towards the right, on the set of cup springs 17. If the force which acts upon the spindle member 12 exceeds a certain threshold value, then the sleeve 16 yields so far in the direction of the set of cup springs 17 that the balls 13 can pass outwards and, in doing so, permit the longitudinal displacement of the spindle member 12 towards the left.

The initial tension of the set of cup springs 17 necessary for the adjustment of the threshold value according to the given drilling conditions is effected by altering the spacing between the shoulders 10 and 18. In order to reduce the spacing and so increase the spring initial tension, the pipe members 1 and 2 are screwed further together and in order to increase the spacing and so reduce the initial tension of the springs they are correspondingly unscrewed. A spacing member 3, which is inserted between the adjacent end faces 5 and 6 of the pipe members 1 and against which the end faces 5 and 6 come to bear on tightening and locking of the screw connection 8, serves to maintain the required spacing. For each required adjustment value of the release force, a separate spacing member 3 of appropriate thickness is necessary which can be provided with particulars of the corresponding release force.

The spacing member 3 preferably consists of two half segments which are joined together to form a ring between the pipe members 1 and 2. The spacing member 3 ends in a collar 4 which, when the pipe members 1 and 2 are screwed together, comes to lie in an annular gap 7 formed by different diameters of the pipe members 1 and 2 and which is guided radially and located by the region of the pipe member 2 engaging over it and carrying the end face 6.

The length of engagement of the screw thread 8 is such that even with the greatest possible spacing within the compensating range, the firm connection between the pipe members 1 and 2 can be established and that furthermore, insertion of an appropriate spacing member 3 together with collar 4 is possible without completely unscrewing the screw connection. The interior of the tool, which is filled with oil, is sealed off from the screw thread 8 and so also from the outside region by a seal 9, the seal having a sealing range which corresponds in length to the length of the compensating region and the length of the collar in the spacing member.

The compensating device according to the invention can also be used for other drilling tools, as, for example, for shock-absorbers to vary the initial tension of the set of springs for the purpose of shifting the resonant frequency of the drilling string, or for direct drives for bits to adjust the bearing play or readjust it in the event of wear.

We claim:

1. A compensation device for insertion in and adjusting a drill string for deep-well drilling tools axially within a whole predetermined compensating region of axial length, the drill string having a transversely divided outer pipe, including outer pipe members which can be rigidly connected to one another by a cylindrical screw thread and have adjacent faces as external stop faces extending radially and axially opposite one another adjacent outer diameters of the pipe members and which approach one another during screwing together of the pipe members and move apart from one another during unscrewing and an annular gap formed between different inner smaller diameters of the pipe members adjacent to and extending axially from the faces, the compensation device comprising a spacing member composed of segments each having an outer compensating region of predetermined axial length between axially opposite sides extending radially adjacent its outer diameter, situated axially opposite and engageable by the faces and an inner axially projecting collar insertable into the annular gap and which segments can upon partial unscrewing of the pipe members, be inserted radially from outside and located between the faces of the pipe members and joined together to form a ring between the faces and a collar retained in the annular gap by tightening the pipe members and that the screw thread has a length of engagement which is increased by the axial length of the whole predetermined compensating region and the collar.

2. A device as claimed in claim 1 in which regions provided to receive the spacing member as well as the screw thread are sealed off from the interior surrounded by the pipe members by means of a seal between and engaging the pipe members, and that the seal comprises a sealing region on the pipe members situated adjacent the screw threads and of an axial length which corresponds to the axial length of the compensating region as well as the axial length of the collar.

3. A compensation device for insertion in and adjusting a drill string for deep-well drilling tools axially within a whole predetermined compensating region of axial length, the drill string having a transversely divided outer pipe, including outer pipe members which can be rigidly connected to one another by a cylindrical screw thread and have adjacent faces as stop faces which approach one another during screwing together of the pipe members and move apart from one another during unscrewing and an annular gap formed between different diameters of the pipe members adjacent the faces, the compensation device comprising a spacing member composed of segments each having an outer compensating region of predetermined axial length engageable by the faces and an inner axially projecting collar insertable into the annular gap and which segments can upon partial unscrewing of the pipe members, be inserted radially from outside and located between the faces of the pipe members and joined together to form a ring between the faces and a collar retained in the annular gap by tightening the pipe members and that the screw thread has a length of engagement which is increased by the axial length of the whole predetermined compensating region and the collar; and spring means disposed within and compressible between axially spaced internal shoulders of the outer pipe members and wherein the compensating region of predetermined axial length of the spacing member between the faces adjusts the axial spacing of the internal shoulders and thereby the axial length of and force exerted by the spring means.

4. A compensation device according to claim 3 further comprising:

an inner spindle with an outer tapered thickened portion extending axially within the outer pipe members; and a locking device disposed in between the spring means and one of the internal shoulders and which lockingly engages the outer tapered thickened portion and prevents telescopic axial displacement of the inner spindle until unlocked by the application of an axial overload force sufficient to overcome the axial force exerted by the spring means against the locking device.

5. A compensation device according to claim 3 wherein the locking device comprises:

a sleeve with an inner tapered thickened portion disposed in an outer pipe member, forcefully engaged and displaced axially by the spring means toward the internal shoulder; and radially displaceable locking balls disposed in an annular space between the inner tapered thickened portion of the sleeve and the outer tapered thickened portion of the inner spindle whereby upon imposing a sufficient axial overload to overcome the force exerted by the spring means, the outer tapered thickened portion of the spindle forces the balls radially outward, the balls rollingly engage and simultaneously displace the inner tapered thickened portion of the sleeve and thereby compress the spring means and allows the balls to move radially out of locking engagement with the outer tapered thickened portion of the inner spindle.

* * * * *